(12) United States Patent
Schneider

(10) Patent No.: US 8,713,329 B2
(45) Date of Patent: *Apr. 29, 2014

(54) AUTHENTICATED SECRET SHARING

(75) Inventor: James P. Schneider, Raleigh, NC (US)

(73) Assignee: Red Hat, Inc., Raleigh, NC (US)

(*) Notice: Subject to any disclaimer, the term of this patent is extended or adjusted under 35 U.S.C. 154(b) by 1076 days.

This patent is subject to a terminal disclaimer.

(21) Appl. No.: 12/393,966

(22) Filed: Feb. 26, 2009

(65) Prior Publication Data
US 2010/0217986 A1    Aug. 26, 2010

(51) Int. Cl.
*H04L 9/32* (2006.01)
(52) U.S. Cl.
USPC ........... 713/193; 713/168; 713/169; 713/171; 380/28; 380/29; 380/30; 380/33; 380/46; 380/255; 380/277; 380/283
(58) Field of Classification Search
CPC ................................ H04L 9/32; H04L 9/3242
USPC .......... 713/168–169, 171; 380/28–30, 33, 46, 380/255, 277, 283
See application file for complete search history.

(56) References Cited

U.S. PATENT DOCUMENTS 7,607,012 B2 * 10/2009 Nyberg .......................... 713/168
8,189,771 B2 *  5/2012 Ghouti et al. .................. 380/28

OTHER PUBLICATIONS

Asmuth, Charles et al., "A Modular Approach to Key Safeguarding", *IEEE Transactions on Information Theory*, vol. IT-29, No. 2, Mar. 1983, pp. 208-210.
Blakley, G. R. et al., "Safeguarding Cryptographic Keys", *National Computer Conference, 1979, AFIPS—Conference Proceedings*, vol. 48, AFIPS Press, Montvale, NJ 07645, pp. 313-317.
Blakley, G. R. et al., "Security of Ramp Schemes", *Lecture Notes in Computer Science—Advances in Cryptology, Proceedings of CRYPTO 84*, Springer-Verlag, pp. 242-268.
Shamir, Adi et al., "How to Share A Secret", *Programming Techniques, Communications of the ACM*, Nov. 1979, vol. 22, No. 11, pp. 612-613.
Schneier, Bruce, "Applied Cryptography, Second Edition—Protocols, Algorithms and Source Code in C", © 1996, John Wiley & Sons, Inc., title pages, pp. viii and 47-74.

* cited by examiner

Primary Examiner — Thanhnga B Truong
(74) Attorney, Agent, or Firm — Lowenstein Sandler LLP

(57) ABSTRACT

A method and system distributes N shares of a secret among cooperating entities by forming a mathematical construct that has an embedded internal structure to allow authentication of a reconstructed secret. The mathematical construct can be a splitting polynomial constructed using the secret, a key and a message authentication code (MAC) as coefficients. The splitting polynomial is evaluated at N random evaluation points to obtain N result values. N shares of the secret are generated and distributed among the cooperating entities for storage. A reconstructed secret can be authenticated by computing the MAC of the reconstructed secret and verifying a relationship among the coefficients of a reconstructed splitting polynomial using the MAC. If the coefficients do not satisfy the relationship, one or more additional shares of the secret can be used to reconstruct the splitting polynomial and the secret.

16 Claims, 6 Drawing Sheets

SECRET SHARING

SECRET RECONSTRUCTION

AUTHENTICATED SECRET SHARING

TECHNICAL FIELD

Embodiments of the present invention relate to cryptographic techniques, and more specifically, to sharing a secret among cooperating parties.

BACKGROUND

In cryptography, secret sharing refers to any method for distributing a secret among a group of participants, each of which is allocated one or more shares of the secret. The secret can only be reconstructed when a required number of shares are combined together; individual shares are of no use on their own.

A secure secret sharing scheme distributes shares so that anyone with fewer than the required shares has no extra information about the secret than someone with zero shares. Some secret sharing schemes allow the secret to be reconstructed by a subset of the total number of generated shares. Thus, a secret can be reconstructed even when some of the shares are lost or when some of the shareholders are absent.

Conventional secret sharing schemes generally are not resistant to intentionally forged bad secrets. An entity cannot easily verify the authenticity of a secret that is presumably reconstructed from distributed shares. Further, one conventional scheme for secret sharing is to evaluate a polynomial over GF(q) at given points. With this technique, the recipients need to know how many shares are necessary to reconstruct the secret, as the reconstructed secret has no internal structure. Thus, there is a need to develop a secret sharing technique that overcomes the above inherent limitation of the known techniques.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Figure 1:
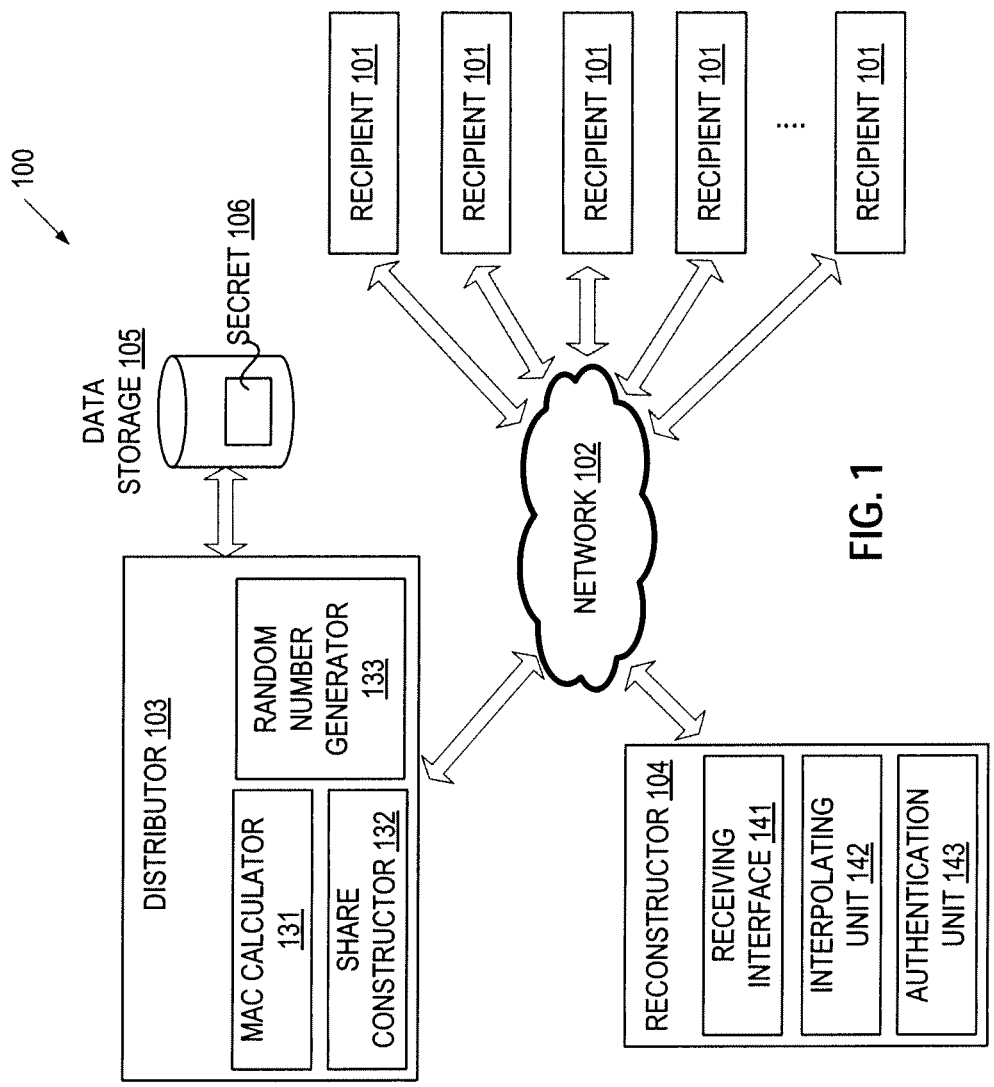
FIG. 1 illustrates a network architecture in which embodiments of the present invention may be implemented.

A method and system distributes N shares of a secret among cooperating entities by forming a mathematical construct that has an embedded internal structure to allow authentication of a reconstructed secret. In one embodiment, the mathematical construct is a splitting polynomial is constructed using the secret, a key and an authentication code as coefficients. The authentication code is computed from the secret and the key using a message authentication code (MAC) algorithm. The splitting polynomial is evaluated at N random evaluation points to obtain N result values. N shares of the secret are generated, each share including one of the N evaluation points and a corresponding result value. The N shares are distributed among cooperating entities for storage.

To reconstruct the secret, a subset of the shares are collected from some or all of the cooperating entities. In one embodiment, the splitting polynomial is reconstructed using the collected shares, and the secret is extracted from the splitting polynomial. The extracted secret can be authenticated by verifying a relationship among the coefficients of the splitting polynomial. The extracted secret is authenticated if one of the coefficients (corresponding to the authentication code) can be computed from two other coefficients (corresponding to the secret and the key) using the MAC algorithm. If the coefficients do not satisfy the relationship, one or more additional shares of the secret can be used to reconstruct the splitting polynomial and the secret.

The basic idea of the secret sharing scheme described herein is to extend the secret with a random key and an authentication code (M) computed from the key and the secret. The key can be a random string of suitable length. For example, with a scheme that requires at least three shares to successfully reconstruct the secret, a second degree splitting polynomial over GF(256) can be used to share a 256 bit secret. The coefficients of the splitting polynomial are the secret, the key, and M. The splitting polynomial is used to generates shares of the secret for distribution. During secret reconstruction, the secret, the key, and M are extracted from the splitting polynomial that has been reconstructed from the shares. The reconstructed secret can immediately be validated by verifying that M is equal to the authentication code computed from the secret and the key. If the reconstructed secret cannot be validated, the shareholders can determine if they have enough shares by attempting to successively recreate the secret with more and more shares, stopping when they run out of shares or when they can validate the secret.

An exemplary use of the secret sharing technique is a multi-factor key escrow system, where shares from a master key are given to a set of federated entities such that a subset of these shares can be used to reconstruct the master key. For example, an employee of a company in a high-security position (e.g., a corporate controller, or a human resources specialist) may have a master password that protects a secret key they need to use to authenticate on their corporate workstation. Ordinarily, this master key is only used by this employee. However, if something were to happen to this employee, his/her replacement would need to be able to gain access to this master key. As the master key provides its owner access to sensitive data, the company cannot just give a backup copy of the master key to someone for safe keeping (e.g., it would be disastrous if a disgruntled employee was able to cut himself a million dollar severance check). Thus, the master key can be split up into multiple shares, so that a share is held by each of several trusted employees. A minimum number of these trusted employees would need to present their shares and reconstruct the secret (i.e., the master key). Illustratively, one share may go to the employee's boss, and other shares may be distributed to other department heads or managers.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory.

These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "computing", "constructing", "generating", "evaluating", "distributing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored instructions thereon, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

FIG. 1 illustrates an exemplary cryptosystem 100 in which embodiments of the present invention may operate. The cryptosystem 100 includes a plurality of recipients 101 and a distributor 103 coupled by a network 102, which may be a public network (e.g., Internet) or a private network (e.g., Ethernet or a Local Area Network (LAN)). In one embodiment, each of the distributor 103 and recipients 101 is a computing system that manages secret information. Alternatively, the distributor 103 may be a computing system and each recipient 101 may be a storage device for receiving and storing one or more shares of a secret. The distributor 103 is locally coupled to data storage 105 in which a secret 106 is stored. Data storage 105 may include one or more storage devices (e.g., the computer-readable medium described above) that are local to the distributor 103 and/or remote from the distributor 103. In alternative embodiments, the secret 106 may be stored in the main memory of the distributor 103. In one embodiment, the secret 106 may be a cryptographic key, a password, or any secret data to be jointly held in escrow by the recipients 101.

The secret 106 may be a number, a bit string, an ASCII coded text or other representations that can be converted into a sequence of numbers, with each number an element of a field (e.g., a finite field or an infinite field, although in an infinite field, the numbers may become too large for efficient computation if there are a large number of shares). Alternatively, each number may be an element of a ring where exact division can be efficiently computed. According to one embodiment of the present invention, the sequence of numbers can be combined with random information to construct a secret splitting polynomial (also referred to as a "splitting polynomial"), based on which shares of the secret can be created for distribution. The generation of the splitting polynomial will be described in greater detail with reference to FIG. 2.

To safeguard the secret 106, the distributor 103 generates a plurality of shares of the secret 106 and distributes one or more shares to each of the recipients 101 through the network 102. The secret 106 can be reconstructed from all or a subset of the distributed shares. In one embodiment, the cryptosystem 100 also includes a reconstructor 104 to reconstruct the secret 106 using the distributed shares. The reconstructor 104 collects the received shares of the secret to form interpolating polynomials, and linearly combines the interpolating polynomials to recover the splitting polynomial. The original secret can be extracted from the splitting polynomial. A person of ordinary skill in the art would appreciate that the reconstructor 104 may be a separate computing system as shown in FIG. 1, or, alternatively, may reside in the same computing system as the distributor 103 or any of the recipients 101. In one embodiment, the distributor 103, the recipients 101 and/or the reconstructor 104 may be, for example, servers, personal computers (PCs), mobile phones, palm-sized computing devices, personal digital assistants (PDAs), or the like.

In one embodiment, the distributor 103 includes a MAC calculator 131 to generate a message authentication code (also referred to as "authentication code" or "MAC") over the secret 106, a share constructor 132 to construct a splitting polynomial and to generate shares from the splitting polynomial, and a random number generator 133 to generate random numbers in a chosen field of ring. The MAC is to be embedded in the distributed shares and to be used for authenticating a reconstructed secret. The computation of the MAC will be described in detail with reference to FIG. 2.

In one embodiment, the reconstructor 104 includes a receiving interface 141 to collect shares of the secret 106 from the recipients 101, an interpolating unit 142 to reconstruct the splitting polynomial from the collected shares, and an authentication unit 143 to authenticate the reconstructed secret that has been extracted from the splitting polynomial. The reconstructor 104 collects a number of shares from some or all of the recipients 101. If the reconstructor 104 knows the threshold number (K) of shares for secret reconstruction, it can collect exact K shares. If the reconstructor 104 does not know the value of K, it can reconstruct the secret by successively adding more shares to the reconstruction and authenticating the reconstructed result. The secret is successfully reconstructed if the reconstructed result can be authenticated using the MAC embedded in the splitting polynomial. If the collected shares are corrupted or the number of collected shares is less than K, the reconstructed result cannot be authenticated. At this point, more shares can be collected and used in the reconstruction until the reconstructor 104 runs out all of the available shares or until the reconstructed secret is authenticated.

In one embodiment, each of the MAC calculator 131, the share constructor 132, the random number generator 133, the interpolating unit 142, and the authentication unit 143 includes arithmetic processing units, such as adders, multipliers, subtractors, dividers, etc., as well as memory circuitry, such as registers, RAM, etc., to perform mathematical calculations. The operations of these components will be described in greater detail below in connection with FIGS. 2-4.

Figure 2:
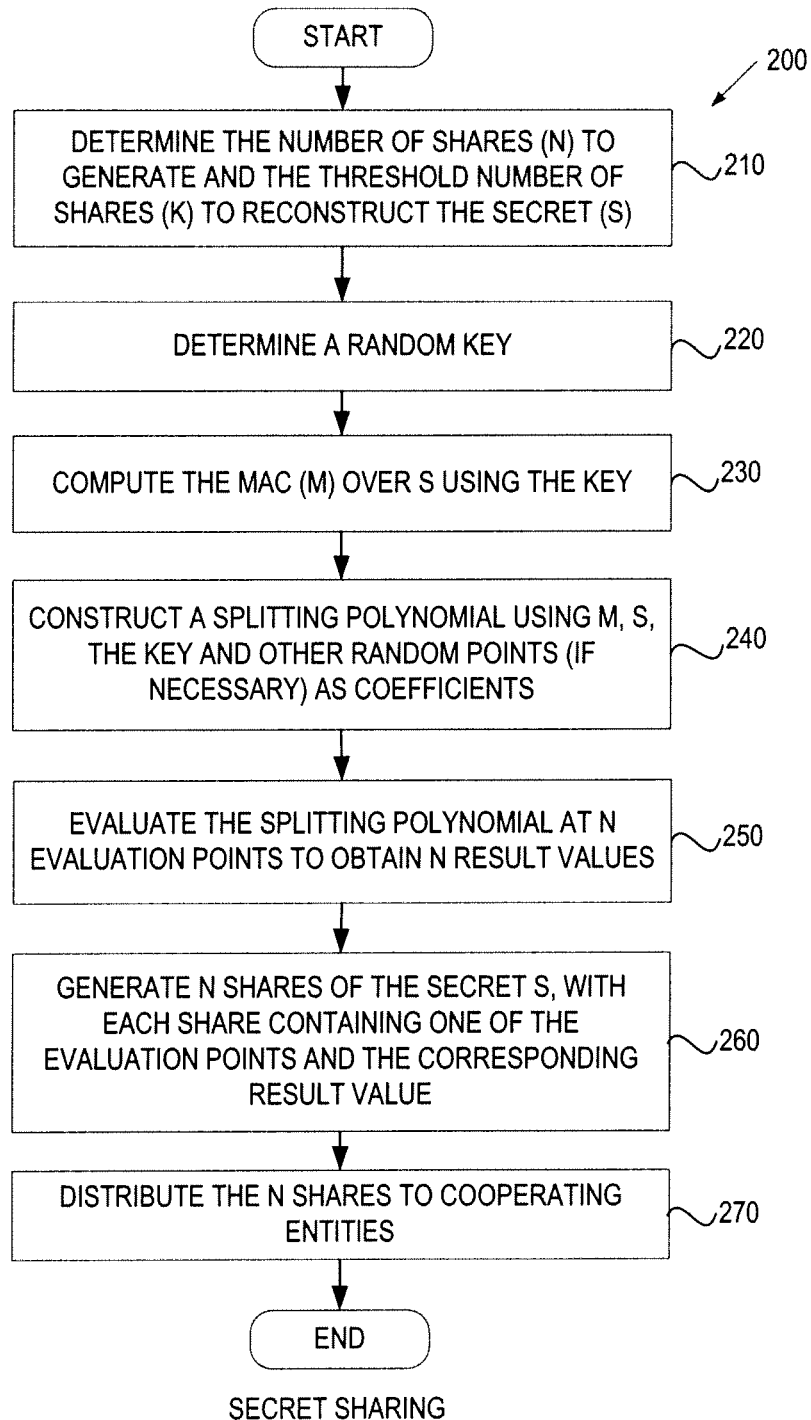
FIG. 2 is a flow diagram of a secret sharing method according to one embodiment of the present invention.

FIG. 2 illustrates a flow diagram of one embodiment of a method 200 for generating a plurality of shares from a secret (e.g., the secret 106). The method 200 may be performed by the processing logic 526 of FIG. 5 that may comprise hardware (e.g., circuitry, dedicated logic, programmable logic, microcode, etc.), software (such as instructions on a computer readable storage medium executable by a processing device), or a combination thereof. In one embodiment, the method 200 is performed by the distributor 103 of FIG. 1.

Referring to FIG. 2, at block 210, the method 200 begins with the distributor 103 determining the total number (N) of shares to be generated and the threshold number (K) of shares for reconstruction. Alternatively, the determination may be made by a user or an administrator of the distributor 103, based on the available computing or storage resources and the available number of recipients 101 that can jointly hold the shares of the secret (S). At block 220, a random number is generated. The random number is to be used as a key in the generation of a message authentication code (MAC), e.g., a keyed-Hash Message Authentication Code (abbreviated as HMAC or KHMAC). The MAC can be used to verify data integrity and the authenticity of a reconstructed secret. The length and the quality of the key can be selected to satisfy a desired cryptographic strength of the MAC.

At block 230, the distributor 103 computes the MAC (represented as M) over the secret using the random key and a hash function (e.g., MD5, SHA-1, or any iterative cryptographic hash functions) based on MAC algorithms known in the art. For example, an MAC over S can be computed as M=h((key xor opad)||h((key xor ipad)||S)), where h is a hash function, "key" is the random key, "opad" and "ipad" are values constructed to be the same length as the key and are used to guarantee that the data being hashed do not share a common prefix, "xor" is an exclusive—or operator and "||" represents concatenation. Other MAC algorithms can also be used to calculate the MAC.

At block 240, the distributor 103 constructs a secret splitting polynomial of degree (K−1) with K coefficients, where K is the threshold number of shares for reconstructing the secret. Three of the K coefficients are the MAC (M), the secret (S) and the key. If K is greater than 3, additional random elements are generated. In an embodiment, the splitting polynomial may be constructed as: $c_{k-1}Y^{k-1}+c_{k-2}Y^{k-2}+\ldots+c_1Y+c_0$, where three of the coefficients $(c_{k-1}, c_{k-2}, \ldots, c_1, c_0)$ are M, S and the key. The locations of M, S and the key within the splitting polynomial are communicated to the recipients 101 and/or the reconstructor 104 for secret reconstruction. For example, if $c_2$=M, $c_1$=S and $c_0$=the key, the distributor 103 can inform the reconstructor 104 that M, S, the key, in that order, can be extracted from the lowest three terms of the splitting polynomial.

Continuing to block 250, the distributor 103 evaluates the splitting polynomial at N non-zero random points (also referred to as "evaluation points") in the chosen field or ring. The evaluation is performed by arithmetic logic circuits of the share constructor 132 (e.g., adders, subtractors, multipliers and/or dividers, etc.). The evaluations generate N result values, with one result value corresponding to one evaluation point. At block 260, the distributor 103 generates N shares of the secret, with each share including one of the evaluation points and the corresponding result value. At block 270, the distributor 103 then distributes the N shares to the recipients 101 and the method 200 terminates.

It is understood that the above operations may follow a different sequence from what is shown in FIG. 2. For example, the computation of the MAC may be performed before the parameters N and K are determined.

In an alternative embodiment, the distributor 103 may generate N shares of a secret by constructing a system of N linear equations over a finite field, e.g., GF(q), where q is a power of a prime number. The system of linear equations has K unknowns (N>=K), and the solution of the system is a K-tuple that includes the secret, the key and the MAC as elements.

As an example, a 256-bit secret (S) can be shared using operations over GF(256). To construct a secret sharing scheme requiring four shares (e.g., K=4) to reconstruct the secret, the following operations can be performed:
1) Generate a random 256-bit quantity as the key.
2) Calculate M=H(key, S), wherein H is a hash function and M is the MAC.
3) Generate a random 256-bit quantity R.
4) Construct N (where N>=4) distinct linear equations over GF(256) in four unknowns such that each equation has a solution at the point (R, key, M, S), and any set of four of these equations is linearly independent.

The shares will be the N equations, or a representation of the N equations, in step (4). For more required shares (e.g., K>4), additional random components can be generated in step (3). For example, to require five shares for secret reconstruction (e.g., K=5), random components R and Q can be generated in step (3), and the equations will have a solution at (R, Q, key, M, S). In an example where K=3, the R component can be eliminated. To reconstruct the secret, K shares are collected to obtain K of the equations. The K equations can be solved to obtain the key, the secret, M and the other (K−3) random components. The reconstructed secret can be verified by computing the MAC of the reconstructed secret and compare the MAC with the M value in the solution.

Alternatively, the distributor 103 may use linear interpolation over a finite field to generate N shares of a secret. For example, the secret, the key and the MAC can be represented as coefficients of a linear equation, and solutions for the equation represent the shares. The number of required shares (K) for secret reconstruction is equal the number of variables in the equation. Secret sharing using a linear interpolation technique is described in U.S. patent application Ser. No. 12/202,107 filed on Aug. 29, 2008 titled "Sharing a Secret via Linear Interpolation," which is incorporated by reference. The distributor 103 can also use simultaneous modular equations over a finite field to generate the shares. For example, the secret, the key and the MAC can be embedded in an extension polynomial, and N random co-prime polynomials can be chosen as N divisors of the extension polynomial. Each share of the secret includes a remainder and a corresponding divisor. Secret sharing using simultaneous modular equations is described in U.S. patent application Ser. No. 12/197,089 filed on Aug. 22, 2008 titled "Embedding a Secret in a Larger Polynomial," which is incorporated by reference. The secret, the key and the MAC can also be embedded in the shares using multiplicative inverses in a ring, wherein the ring is defined by a composite integer. Secret sharing using multiplicative inverses in a ring is described in a co-filed U.S. patent application attorney reference Ser. No. 12/393,967 filed on Feb. 26, 2009 titled "Sharing a Secret with modular inverses," which is incorporated by reference.

Figure 3A:
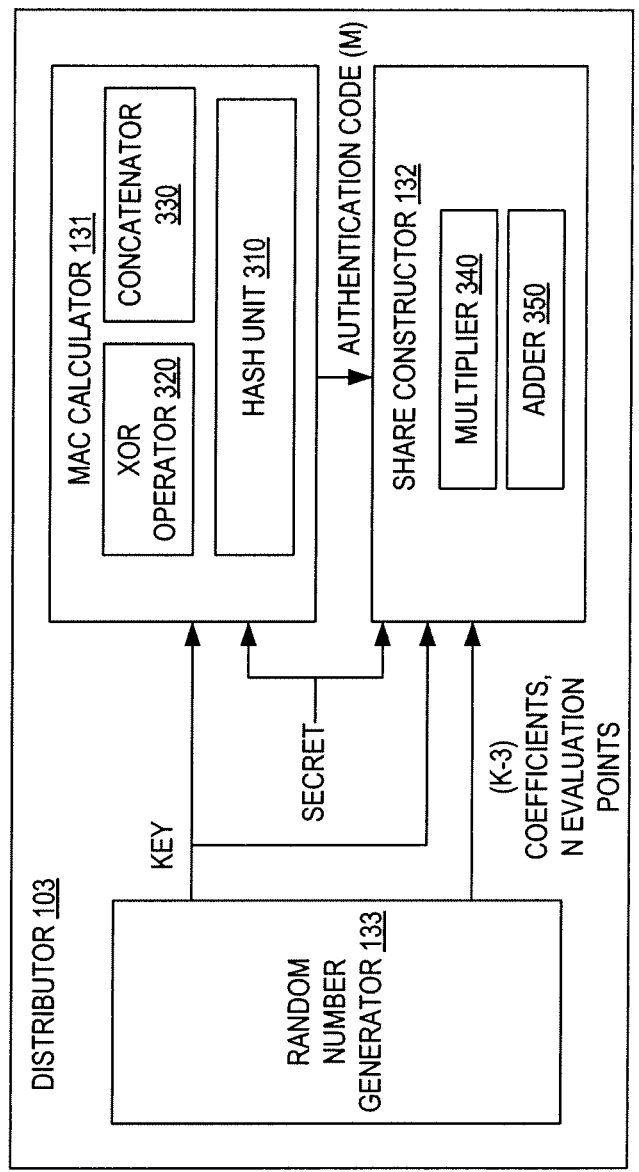
FIG. 3A is a block diagram of an embodiment of a distributor for distributing the secret.
Figure 3B:
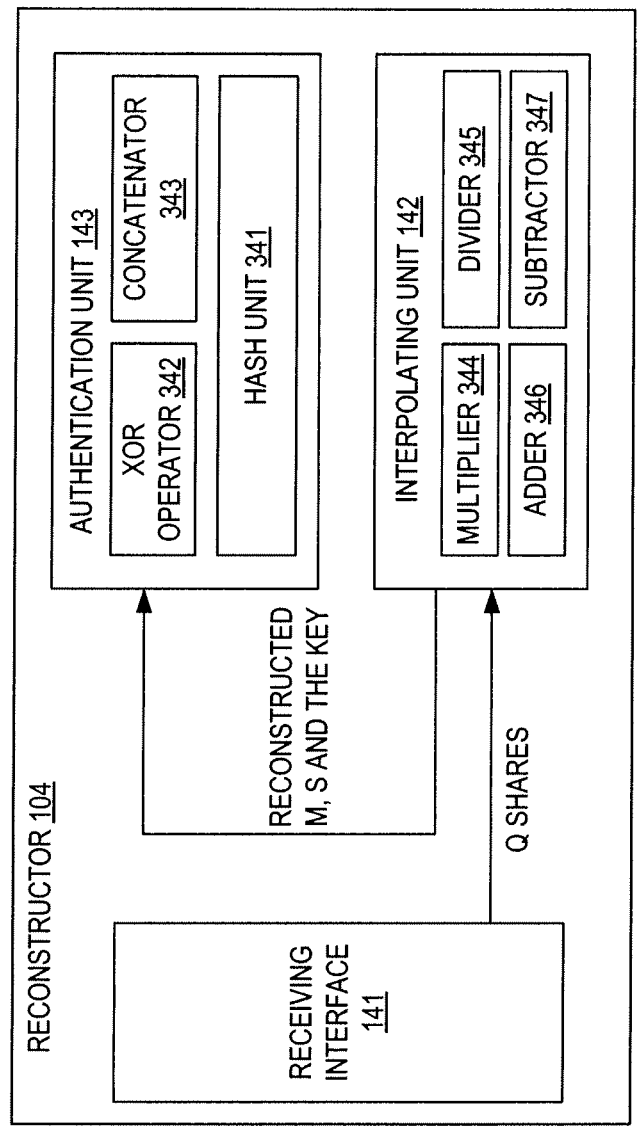
FIG. 3B is a block diagram of an embodiment of a reconstructor for reconstructing the secret.

FIG. 3A is a block diagram illustrating one embodiment of the circuitry in the distributor 103. FIG. 3B is a block diagram illustrating one embodiment of the circuitry in the reconstructor 104. Referring to FIG. 3A, the distributor 103 includes the random number generator 131 to provide a random key to the MAC calculator 132 for the generation of an authentication code M. The random number generator 131 also provides additional coefficients of the splitting polynomial (if the threshold number of shares for secret reconstruction K is greater than 3) and N evaluation points to the share constructor 133. In one embodiment, the MAC calculator 132 includes a hash unit 310 for computing a hash value, an xor operator 320 and a concatenator 330. Different hardware components may be included to implement different MAC algorithms. The share constructor 133 includes one or more multipliers 340 and adders 350 for evaluating the splitting polynomial at N evaluation points. Additional computation units can also be included.

Referring to FIG. 3B, the reconstructor 104 includes the receiving interface 141 to collect shares and to provide collected shares to the interpolating unit 142. In one embodiment, the interpolating unit 142 includes one or more multipliers 344, dividers 345, adders 346 and subtractors 347 for generating interpolating polynomials and reconstructing the splitting polynomial. Additional computation units can also be included. The secret (S), the authentication code (M) and the key extracted from the splitting polynomial are sent to the authentication unit 143 for authentication. In one embodiment, the authentication unit 143 includes a hash unit 341 for computing a hash value, an xor operator 342 and a concatenator 343 to perform the same computations as the MAC calculator 132. Different hardware components may be included to implement different MAC algorithms.

Figure 4:
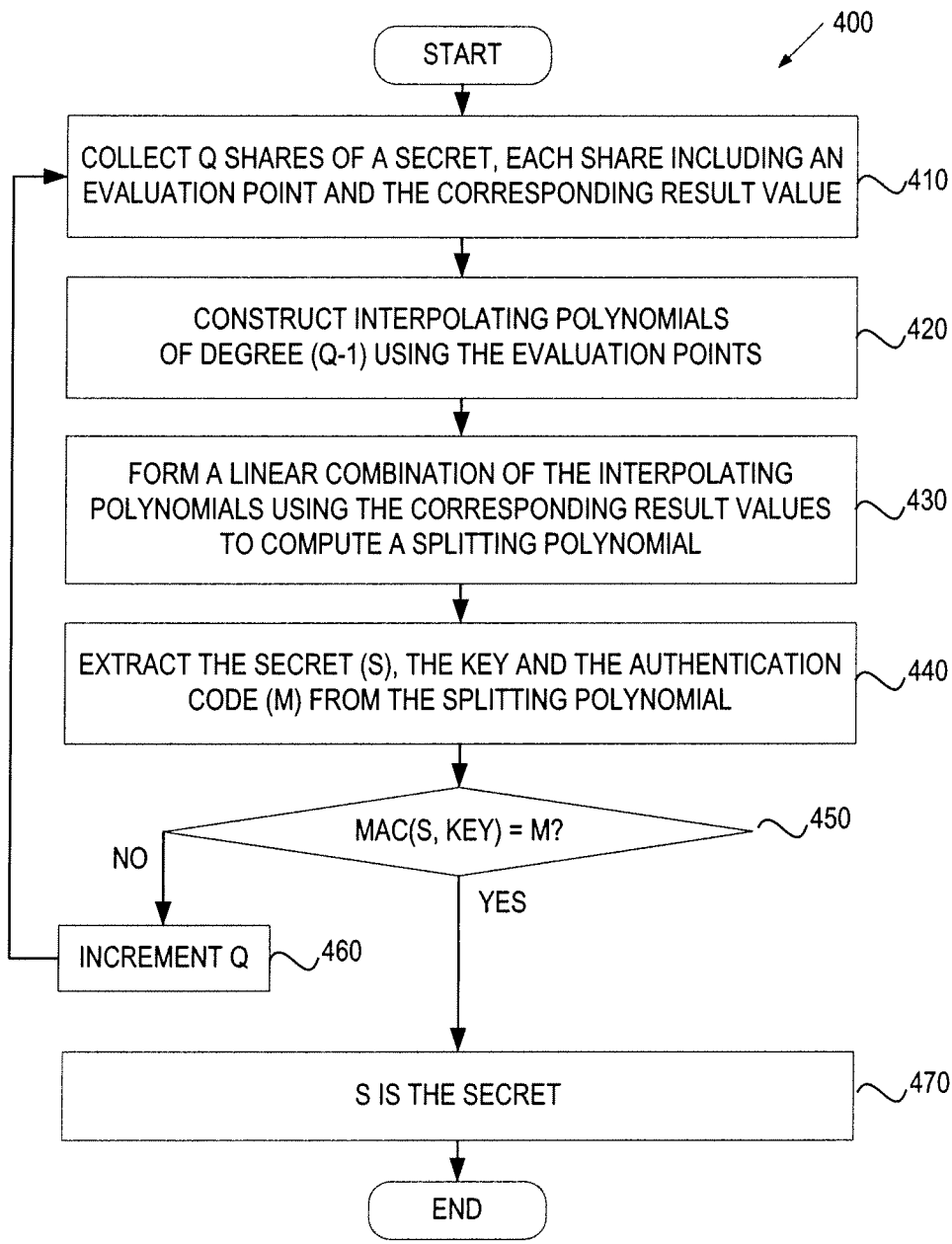
FIG. 4 is a flow diagram of a secret reconstruction method according to one embodiment of the present invention.

Having described the techniques for share generation, the following descriptions explain, in detail, an embodiment of the technique for reconstructing the secret from the distributed shares. FIG. 4 illustrates a flow diagram of an embodiment of a method 400 for reconstructing the secret from the distributed shares. The method 400 may be performed by the processing logic 526 of FIG. 5 that may comprise hardware (e.g., circuitry, dedicated logic, programmable logic, microcode, etc.), software (such as instructions on a computer readable storage medium executable by a processing device), or a combination thereof. In one embodiment, the method 400 is performed by the reconstructor 104 of FIG. 1.

Referring to FIG. 4, at block 410, the receiving interface 141 of the reconstructor 104 receives Q shares of the secret, each of the Q shares including a pair of values (x, y), where x is an evaluation point and y is the corresponding result value, as described above with reference to FIG. 2. At block 420, the interpolating unit 142 of the reconstructor 104 constructs Q interpolating polynomials (e.g., Lagrange form basis polynomials, Newton polynomials, Chebyshev polynomials, Berstein polynomials, etc.) to interpolate the Q pairs of (x, y). The construction of the interpolating polynomials uses the Q evaluation points. It is understood that alternative techniques can be used to interpolate the Q pairs of (x, y), such as a system of linear equations or other techniques commonly known in the field of numerical analysis. At block 430, the interpolating unit 142 computes a linear combination of the interpolating polynomials using the Q result values. The result of the linear combination is a splitting polynomial, which is the same as the splitting polynomial used for share generation if the secret is to be successfully reconstructed. At block 440, the authentication unit 143 of the reconstructor 104 extracts the secret (S), the MAC (M) and the key (Key) from the coefficients of the splitting polynomial. The authentication unit 143 needs to know where the values occur within the reconstructed splitting polynomial. The locations of S, M and the key in the splitting polynomial can be communicated to the authentication unit 143 from the distributor 103, the recipients 101, or a site that publishes the information to authorized entities. If, at block 450, the authentication unit 143 verifies that MAC(S, Key)=M, the reconstructed secret S is authenticated to be the secret (block 470). If MAC(S, Key) is not equal to M, at block 460, the value of Q (the number of collected shares) is incremented and the method 400 returns to block 410 to collect more shares. The amount of share increment can be one, or more than one if it is known that certain share numbers can be skipped. The method 400 continues until the reconstructed secret is authenticated or all of the available shares are exhausted.

An extension of the above-described secret sharing scheme can be used in cases where only two recipients 101 need to cooperate to reconstruct the secret. The scheme distributes more than one share to each recipient 101, and requires at least one more share than the most any recipient has for secret reconstruction, but not so many that the required shares are more than any two recipients have. That is, the threshold number of shares K is greater than the most any recipient has, and is less than or equal to the sum of any two recipients have.

For example, a secret is shared among Alice, Bob, and Carol with an (N, K) secret sharing scheme, where the number of generated secret N=4 and the threshold number of required shares K for reconstruction=3. If each person is issued two shares of the secret, any two of them can get together and reconstruct the secret and authenticate that they have correctly reconstructed the secret. Alternatively, in an (N, K) scheme where N=14 and K=8, five shares can be given to Alice, three shares to Bob, and six shares to Carol. With this alternative approach, any two of them can get together and reconstruct the secret and authenticate that they have correctly reconstructed the secret.

A person of ordinary skill in the art will appreciate that the above extension to the secret sharing scheme can be used in the general case, as long as any R recipients has enough shares, and any R−1 recipients do not. Each recipient receives more than one share, regardless of how many recipients are required to reconstruct the secret. The secret is reconstructed by successively adding more shares in the reconstruction until the reconstructed secret can be authenticated. Thus, using the extension scheme can prevent an observer from knowing how many recipients are required to reconstruct the secret.

For example, a secret can be shared among Alice, Bob, Carol, Daniel, and Ellen, such that any 3 of them can reconstruct the secret, but 2 of them cannot. A secret sharing scheme can be implemented by distributing two shares to each of the 5 people, and requiring 5 or 6 shares to reconstruct the secret.

As another example, different numbers of shares can be distributed to Alice, Bob, Carol, Daniel, and Ellen, such that any three of them can reconstruct the secret, but two of them cannot. Using consecutive numbers (so that Ellen has 1 more share than Daniel, Daniel 1 more than Carol, etc), the smallest number of shares Alice can have is 5, with 18 shares required to reconstruct the secret. Using every other number, Alice needs at least 9 shares, and 33 shares are required to reconstruct the secret.

However, with the above hypothetical 5, 6, 7, 8, 9 share distribution, the reconstructor 104 can skip some candidate share numbers based on the number of shares that the shareholders have. For example, if Bob, Carol, and Ellen get together, with 6, 7, and 9 shares, respectively, the 3 people can immediately throw out any number of shares less than 10 (since Ellen would be able to reconstruct the secret by herself if only 9 shares were required). Similarly, after trying unsuccessfully to reconstruct the secret with 10, 11, 12, and 13 (=6+7) shares, the 3 people are able to determine that more than 2 people are required to reconstruct the secret. This is because if 13 shares cannot reconstruct the secret, Bob (having 6 shares) and Carol (having 7 shares) alone cannot do it, which implies that Carol and Ellen alone cannot do it either. Thus, the minimum number of shares that can be required from three shareholders and cannot come from 2 shareholders in this case is 17—one more than Carol and Ellen have together. As a result, the 3 people can skip 14, 15, and 16 shares in the secret reconstruction.

The above scheme assumes that no one shareholder is more important than any other. If the scheme is set up so that Ellen is required to be present for the secret reconstruction, then 14 or 15 shares is the appropriate threshold number of shares for reconstruction. If the shareholders have no way of knowing if one of them is more important than any others, then they will have to try each reconstruction in turn. For example, 14 is the minimum number of shares that requires Ellen's participation, and 15 is the maximum number of shares where Bob can reconstruct a secret with Ellen, without needing Carol. If 16 shares is required, Ellen and Carol can reconstruct the secret without Bob, and Bob will be unable to reconstruct the secret unless both Ellen and Carol were present. Thus, a requirement of 16 shares means that Bob is unnecessary.

The following description provides an example of the secret sharing and reconstruction scheme described above. Assume that the secret to be shared is the 8-bit value 83 (53 in hexadecimal representation, which is the ASCII code for the character 'S'). For simplicity of the discussion, it is also assume that the secret sharing is taking place over the field GF(257) (operations in GF(257) are identical to operations over the integers, modulo 257). A person of ordinary skill in the art would appreciate that any field can be used. For a secure implementation, GF(q) can be used where q is hundreds or thousands of bits.

To calculate the MAC over the secret S, it is assume that the authentication code M=41*Key+59*S+79 (mod 257). It is understood that the calculation of the MAC is simplified for the purpose of illustration; a secure MAC algorithm can be used for a secure implementation of a secret sharing scheme. In this example, Key=219, which produces an M value of 77. To create seven shares (N=7), a sixth degree splitting polynomial can be constructed as $Y^6+bY^5+cY^4+dY^3+219Y^2+77Y+83$. Using the random values 57, 195, 206, and 92 for a, b, c, and d, respectively yields the splitting polynomial $57Y^6+195Y^5+206Y^4+92Y^3+219Y^2+77Y+83$. Evaluating the splitting polynomial at each of the points 1, 2, 3, 4, 5, 6, and 7 produces the seven shares (1, 158), (2, 127), (3, 140), (4, 175), (5, 108), (6, 217), and (7, 64).

The reconstructor can use Lagrange form interpolating polynomials with successively large subsets of shares to reconstruct the secret S. The minimum number of shares for reconstruct a polynomial of at least second degree (with distinct M, S and Key) is three shares. Starting with the three shares (1, 158), (2, 127), (3, 140), the basis polynomials $L_1$, $L_2$ and $L_3$ are:

$$L_1(Y)=(Y-2)/(1-2)*(Y-3)/(1-3)= (Y^2-5Y+6)*2^{-1}=129Y^2+126Y+3 \pmod{257},$$

$$L_2(Y)=(Y-1)/(2-1)*(Y-3)/(2-3)= (Y^2-4Y+3)*(-1)^{-1}=256Y^2+4Y+254 \pmod{257},$$

and $$L_3(Y)=(Y-1)/(3-1)*(Y-2)/(3-2)=(Y^2-3Y+2)*2^{-1}=129 Y^2+127Y+1 \pmod{257}.$$

Using the three polynomials, a trial splitting polynomial can be reconstructed as:

$$158 L_1(Y)+127 L_2(Y)+140 L_3(Y)=(158*129+127*256+ 140*129)Y^2+(158*126+127*4+140*127)Y+ (158*3+127*254+140*1)=22 Y^2+160Y+233.$$

This trial splitting polynomial produces trial values of Key=22, M=160, S=223. To verify the trial values, the MAC over S is calculated and compared with the reconstructed M value. Using the predefined MAC computation, 41*K+59*S+79 (mod 257)=3, which does not match the reconstructed M value. As a result, more shares are needed to reconstruct the secret.

To continue the secret reconstruction, the (4, 175) share can be added to the other three shares in the secret reconstruction. Using this additional share, the basis polynomials $L_1$, $L_2$ and $L_3$ computed above can be adjusted and an additional basis polynomial $L_4$ can be constructed as follows:

$$L_1'(Y)=L_1(Y)*(Y-4)/(1-4)=(129 Y^2+126Y+3)(Y-4)*(-3)^{-1}=214Y^3+130Y^2+167Y+4,$$

$$L_2'(Y)=L_2(Y)*(Y-4)/(2-4)=(256Y^2+4Y+254)(Y-4)*(-2)^{-1}=129Y^3+253Y^2+138Y+251,$$

$$L_3'(Y)=L_3(Y)*(Y-4)/(3-4)=(129Y^2+127Y+1)(Y-4)*(-1)^{-1}=128Y^3+132Y^2+250Y+4,$$

and $$L_4'(Y)=(Y-1)/(4-1)*(Y-2)/(4-2)*(Y-3)/(4-3)=(Y^3+251Y^2+11Y+251)*6^{-1}=43Y^3+256Y^2+216Y+256.$$

The four basis polynomials produce a trial splitting polynomial of $82Y^3+44Y^2+34Y+255$, from which the trial values Key=44, M=34, S=255 are extracted. To verify the trial values, the MAC over S is calculated and compared with the reconstructed M value. Using the predefined MAC computation, 41*Key+59*S+79 (mod 257) yields 223, which is not equal to 34 (the reconstructed M). Thus, more shares are needed.

Continuing the secret reconstruction as described above, ultimately all seven shares will be used to reconstruct the splitting polynomial $57Y^6+195Y^5+206Y^4+92Y^3+219Y^2+77Y+83$, which gives the trial values Key=219, M=77, S=83. Validation of these values using 41*K+59*S+79 (mod 257) yields 77, which matches the reconstructed M value. Thus, the secret is successfully reconstructed and authenticated using seven shares.

Figure 5:
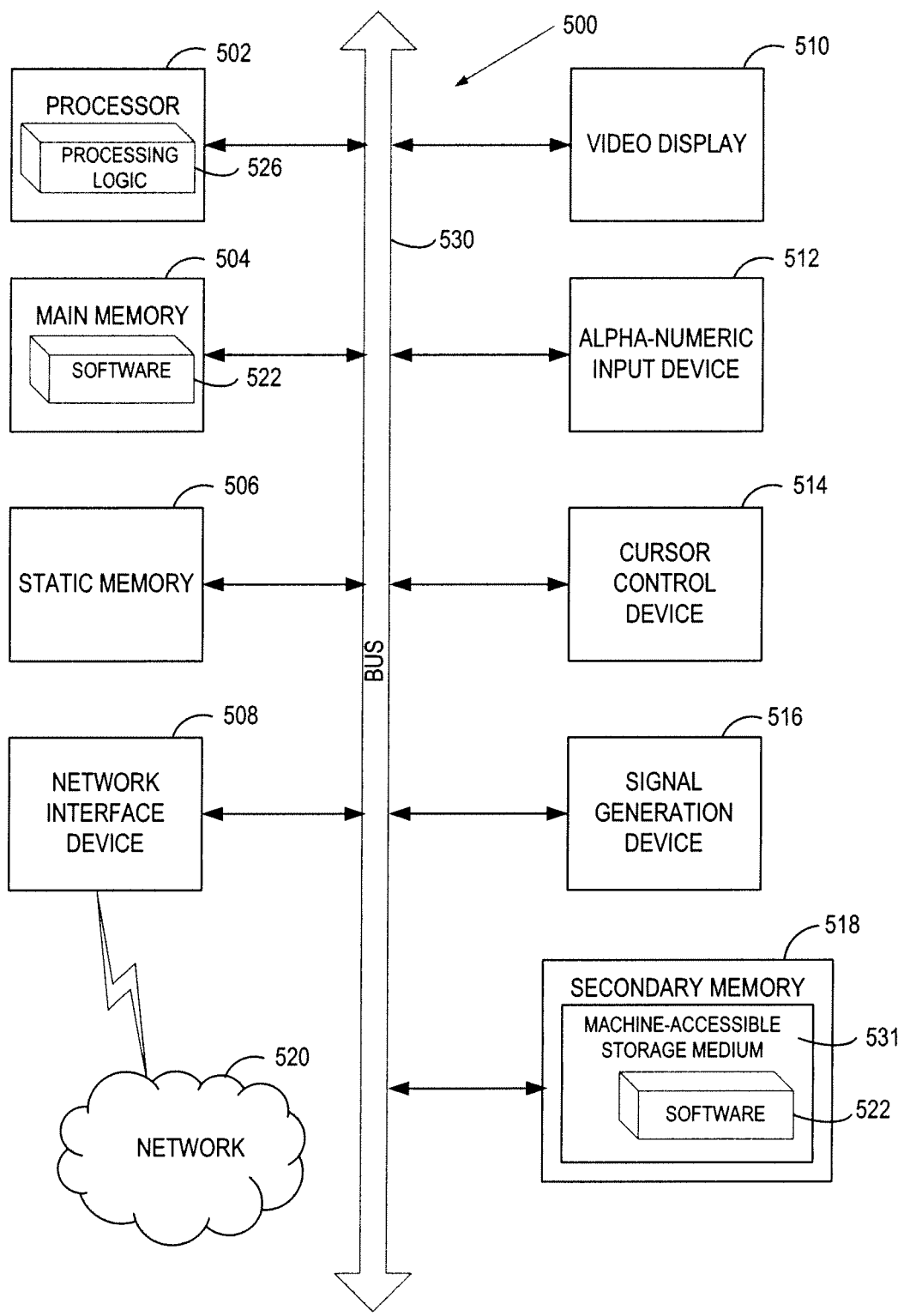
FIG. 5 illustrates a block diagram of an exemplary computer system implementing some embodiments of the present invention.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a device machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 518 (e.g., a data storage device), which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The secondary memory 518 may include a machine-readable storage medium (or more specifically a computer-readable storage medium) 531 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-readable storage media. The software 522 may further be transmitted or received over a network 520 via the network interface device 508.

The machine-readable storage medium 531 may also be used to store the secret 106 of FIG. 1. While the machine-readable storage medium 531 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

Thus, a method and a system for sharing a secret and authenticating a reconstructed secret have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
   computing, by a processing device, an authentication code of a secret using a key;
   constructing, by the processing device, a mathematical construct using the authentication code, the secret, the key, and a first number of random values, wherein the first number is three less than a threshold number of shares for reconstructing the secret; and
   using, by the processing device, a second number of instances of the mathematical construct to generate the second number of shares of the secret for distributed storage among cooperating entities.

2. The method of claim 1 wherein the mathematical construct is a splitting polynomial, the method further comprising:
   evaluating the splitting polynomial at the second number of random evaluation points to obtain the second number of result values; and
   generating the second number of shares of the secret, each share comprising one of the second number of evaluation points and a corresponding result value.

3. The method of claim 1 wherein the mathematical construct is a system of the second number of distinct linear equations over GF(q) having the threshold number of unknowns, q being a power of a prime number, each equation having a solution that comprises the authentication code, the secret and the key, and any set of the threshold number of equations is linearly independent, the method further comprising:
   generating the second number of shares of the secret, each share comprising one of the second number of linear equations.

4. The method of claim 1 wherein the mathematical construct is a linear equation comprising the authentication code, the secret and the key as coefficients.

5. The method of claim 1 wherein the mathematical construct is a set of simultaneous modular equations over a finite field, the authentication code, the secret and the key embedded in set of simultaneous modular equations.

6. The method of claim 1 wherein the mathematical construct is a set of multiplicative inverses in a ring defined by a composite of integers.

7. The method of claim 1, wherein computing an authentication code further comprises: computing the authentication code using a random number as the key and a hash function.

8. The method of claim 1, wherein generating the second number of shares of the secret further comprises:
distributing more than one share to each cooperating entity, with any of a third number of cooperating entities being able to reconstruct the secret and any of a fourth number of cooperating entities not being able to reconstruct the secret, wherein the fourth number is one less than the third number.

9. The method of claim 1, wherein generating the second number of shares of the secret further comprises:
distributing the second number of shares to the cooperating entities, without informing the cooperating entities of the number of shares necessary for reconstructing the secret.

10. A system comprising:
data storage to store the secret; and
a processing device coupled to the data storage, the processing device comprising:
first circuitry to generate an authentication code of the secret based on a key; and
second circuitry to construct a mathematical construct using the authentication code, the secret, the key, and a first number of random values, wherein the first number is three less than a threshold number of shares for reconstructing the secret, and to use a second number of instances of the mathematical construct to generate the second number of shares of the secret for distributed storage among cooperating entities.

11. The system of claim 10, wherein the mathematical construct is a splitting polynomial that has at least the authentication code, the secret, and the key as coefficients, the second circuitry to evaluate the splitting polynomial at the second number of random evaluation points to obtain the second number of result values, and to generate the second number of shares with each share comprising one of the second number of evaluation points and a corresponding result value.

12. The system of claim 10, wherein the first circuitry comprises a hash unit to compute a hash value of the secret and the key.

13. A non-transitory computer readable storage medium comprising instructions that, when executed by a processing device, cause the processing device to perform operations comprising:
computing an authentication code of a secret using a key;
constructing, by the processing device a mathematical construct using the authentication code, the secret, the key, and a first number of random values, wherein the first number is three less than a threshold number of shares for reconstructing the secret; and
using a second number of instances of the mathematical construct to generate the second number of shares of the secret for distributed storage among cooperating entities.

14. The non-transitory computer readable storage medium of claim 13, wherein the mathematical construct is a splitting polynomial and the operations further comprise:
evaluating the splitting polynomial at the second number of random evaluation points to obtain the second number of result values; and
generating the second number of shares of the secret, each share comprising one of the second number of evaluation points and a corresponding result value.

15. The non-transitory computer readable storage medium of claim 13, wherein the mathematical construct is a system of the second number of distinct linear equations over $GF(q)$ having the threshold number of unknowns, q being a power of a prime number, each equation having a solution that comprises the authentication code, the secret and the key, and any set of the threshold number of equations is linearly independent, the operations further comprising:
generating the second number of shares of the secret, each share comprising one of the second number of linear equations.

16. The non-transitory computer readable storage medium of claim 13, wherein computing an authentication code further comprises:
computing the authentication code using a random number as the key and a hash function.

* * * * *